2,841,518
FUNGICIDAL COMPOSITIONS

Irving D. Webb, Rosemead, and John W. Yale, Jr., Yorba Linda, Calif., assignors, by mesne assignments, to Collier Carbon and Chemical Corporation, a corporation of California No Drawing. Application January 9, 1956
Serial No. 557,875

9 Claims. (Cl. 167—22)

This invention relates to fungicidal compositions, and in particular concerns fungicidal compositions comprising a methyl orthothioformate sulfide as the essential active ingredient.

Methyl orthothioformate is the methyl ester of orthothioformic acid, and is conveniently prepared by reacting methyl mercaptan with a haloform, e. g. chloroform, in the presence of an alkaline condensation catalyst or with formic acid in the presence of an acid catalyst. It has the structural formula:

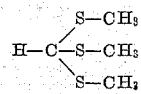

The present invention is based on the discovery that methyl orthothioformate reacts with elemental sulfur to form sulfide compounds which display unusual fungicidal activity. Such activity is far greater than the sum of the individual activities of elemental sulfur and the methyl orthothioformate. The invention thus relates to new chemical entities which are herein termed "methyl orthothioformate sulfides," and to fungicidal compositions comprising one or more of such entities as the essential active ingredient.

The reaction between methyl orthothioformate and free sulfur to form the new fungicidally active materials takes place readily upon heating a mixture of the two reactants at such temperature that the sulfur becomes chemically bound to the orthothioformate and does not separate therefrom when the mixture is cooled. If a mixture of free sulfur and methyl orthothioformate is gradually heated it will be observed that at a relatively low temperature, e. g. 80° C., the sulfur dissolves and the mixture becomes a single liquid phase. If the heating is stopped at this point and the mixture is allowed to cool to about 20° C., the free sulfur precipitates, thus indicating that mere physical solution rather than chemical reaction has occurred. On the other hand, if the heating is continued and the temperature is allowed to increase to about 150° C. and maintained there for a suitable period of time, the liquid will not deposit free sulfur upon subsequent cooling, thereby indicating that true chemical reaction has occurred. Accordingly, in preparing the products of the invention it is necessary that the two reactants be heated at such a temperature and for such a period of time that upon subsequent cooling to atmospheric temperature substantially no free sulfur is deposited from the liquid mixture. However, the temperature should not be so high and/or the reaction time so long that any substantial degree of decomposition takes place, as is indicated by the reaction mixture losing weight. The operable temperature range varies somewhat with the amount of sulfur sought to be combined with the methyl orthothioformate but is usually at least about 100° C. and is preferably not greater than about 180° C. The time required for completion of the reaction likewise depends upon the proportions in which the two reactants are employed, as well as upon the reaction temperature. Ordinarily, however, such time is between about 1 and about 4 hours, and as a general rule it will be found that heating at a temperature between about 100° C. and about 150° C. for a period of time between about 1 and about 4 hours will lead to optimum results.

The proportions in which sulfur combines with methyl orthothioformate to form the fungicidal products of the invention varies from about 1 to about 12 atoms of sulfur per mole of methyl orthothioformate. Accordingly, in preparing such products, between about 1 and about 12 gram atoms of sulfur may be provided per gram mole of methyl orthothioformate. The physical and biological properties of the product vary somewhat with the amount of sulfur contained therein, and insofar as fungicidal activity and ease of formulating into simple fungicidal compositions are concerned it is preferred to employ the products prepared by combining from about 1 to about 6 atoms of sulfur with 1 mole of methyl orthothioformate.

Procedurewise, the reaction is carried out simply by charging the desired amount of the two reactants into a reaction vessel and heating the mixture under the conditions previously described. In the interests of minimizing decomposition, the heating may be effected under super-atmospheric pressure, but ordinarily it is preferred to operate at atmospheric pressure and to avoid decomposition by maintaining a suitably low reaction temperature. Also, if desired, the reaction may be carried out in the presence of an inert liquid reaction medium, e. g., benzene, toluene, carbon tetrachloride, etc., which can subsequently either be removed from the finished products by distillation or allowed to remain therewith to serve as a dispersing acid. Ordinarily, however, we prefer to dispense with the use of reaction media, and to effect the reaction by heating a simple mixture of the two reactants. Upon completion of the reaction, the product is cooled, and can be used directly without purification in formulating fungicidal compositions.

The following examples will illustrate the preparation of several of the new products provided by the invention, but are not to be construed as limiting the same.

*Example I*

A mixture consisting of 10.4 parts by weight of elemental sulfur and 25 parts by weight of methyl orthothioformate was heated at 125° C. for 5 minutes to effect complete solution, after which it was cooled to room temperature. Upon cooling, free sulfur precipitated, indicating that reaction was not complete. The mixture was then transferred to a flask fitted with a reflux condenser and was heated at reflux temperature (185°–195° C.) for 1 hour. The product so obtained was a mobile yellow liquid which did not form any precipitate upon cooling to 25° C. and contained two gram atoms of sulfur per mole of methyl orthothioformate.

*Example II*

A mixture consisting of 19.2 parts by weight of sulfur and 15.4 parts by weight of methyl orthothioformate was heated at 135°–150° C. for four hours. The product so obtained was a yellow liquid having a density of 1.46 grams per milliliter at 24° C. and containing six atoms of sulfur per molecule of orthothioformate. It remained a clear liquid upon storage at −20° F.

The fungicidal compositions of the present invention are prepared by combining one or a mixture of the above-defined methyl orthothioformate sulfides with a liquid or solid inert carrier in the conventional manner. Thus, one or a mixture of such products may be dispersed in water with the aid of a dispersing agent to form a concentrate composition which is subsequently diluted with water to form a spray suitable for direct application to living plants, lumber, and other materials subject to fungus attack. Alternatively, the polysulfide products may be admixed with an inert solid diluent such as talc, starch, diatomaceous earth, aluminum silicate, etc. to form a dusting composition which can be employed as such or dispersed in an aqueous of oleaginous medium to form a spray. In general, any of the conventional formulation and application techniques may be applied in employing the present class of fungicidal agents, and any of the various known wetting agents, spreaders, sticking agents, diluents, etc., may be employed in combination with such agents. The latter are substantially nonphytotoxic and may accordingly be applied to living plants in relatively concentrated form. However, as will be apparent from the test data presented below, the fungicides of the present class are highly effective in very small quantities, and in the interests of economy they are usually applied at concentrations of the order of 100–1000 parts per million. Liquid concentrate compositions usually contain between about 1 and about 15 percent by weight of the active ingredient and sufficient of an emulsifying or dispersing agent to maintain the active ingredient uniformly dispersed in the liquid suspending medium. Solid concentrates usually contain between about 5 and about 25 percent by weight of the active ingredient and, optionally, small amounts of spreading agents and other conventional adjuvants.

The following examples will illustrate the formulation of a number of fungicidal compositions comprising members of the present class of methyl orthothioformate sulfides as the primary toxic agent, but are not to be construed as limiting the invention.

*Example III*

|  | Pounds |
|---|---|
| Methyl orthothioformate monosulfide | 2.5 |
| Aluminum silicate | 50.0 |
| Powdered blood albumin | 0.3 |

The ingredients are mixed in a colloid mill and thereafter diluted with 2500 gallons of water to obtain a spray composition containing about 100 parts per million of the active ingredient.

In order to demonstrate the activity of the present class of fungicides, the following test procedure is employed: A 2.5-gram sample of the material to be tested and 2 drops of a non-ionic dispersing agent ("Triton X-171" manufactured by Rohm & Haas Co.) is added to enough distilled water to give 100 grams and homogenized for 3 minutes in a high-speed blender. With the blender still operating, 3 grams of the liquid are removed therefrom and stirred into 75 grams of liquid potato dextrose agar at 45° C., and the agar is transferred to a Petri dish. The agar so prepared thus contains 1000 p. p. m. of the material to be tested. If lower concentrations are to be tested, e. g., 10 or 100 p. p. m., 1-gram portions of the concentrate compositions in the blender are diluted with agar accordingly. The agar is allowed to cool to room temperature, whereupon it solidifies, and a ¼" disk of the test fungus inoculum is placed on the surface of the agar. The inoculated agar is incubated at room temperature for two days, after which the extent of fungus growth is measured, and the percent inhibition of fungus growth is calculated by the formula:

$$100 - \frac{\text{growth on test sample}}{\text{growth on blank}} \times 100$$

The following tabulation presents inhibition values obtained by subjecting several of the methyl orthothioformate polysulfides to the foregoing test procedure, employing a variety of test organisms. The abbreviation "MOTF" stands for methyl orthothioformate.

| Test Material | | Percent Inhibition | | | | | | | |
|---|---|---|---|---|---|---|---|---|---|
| Identity | Conc., p. p. m. | R. solani | S. rolfsii | P. cinnamoni | P. ultimum | S. sclerotiorum | S. fructicola | B. Cinerea | Average for all Organisms |
| MOTF | 80 | 59 | 58 | 100 | −4 | 39 | 61 | 39 | 50 |
| MOTF Monosulfide | 80 | 88 | 73 | 90 | 100 | 69 | 53 | 61 | 76 |
| MOTF Disulfide | 100 | 100 | 80 | 100 | 100 | 100 | 100 | 100 | 97 |
| MOTF Trisulfide | 80 | 90 | 80 | 100 | 100 | 93 | 89 | 92 | 92 |
| MOTF Hexasulfide | 80 |  | 70 | 93 | 100 | 88 | 83 | 64 | 83 |
| MOTF Hexasulfide | 100 | 90 | 88 | 100 | 100 | 86 | 92 | 82 | 91 |
| MOTF Hexasulfide | 1,000 | 100 | 100 | 100 | 100 | 100 | 100 | 100 | 100 |

*Example IV*

|  | |
|---|---|
| Methyl orthothioformate hexasulfide | 2.5 |
| Powdered blood albumin | 0.25 |
| Water | 50.0 |

The toxic agent and blood albumin are added to the water, and the mixture is then passed through a colloid mill or high speed blender to obtain a concentrate composition which can be diluted 1000:1 with water to obtain a fungicidal spray for application to living plants.

*Example V*

|  | Pounds |
|---|---|
| Methyl orthothioformate trisulfide | 0.5 |
| Benzene | 2.0 |
| Non-phytotoxic spray oil | 4000. |
| Amyl orthothioformate heptasulfide | 10.0 |
| Kerosene extract oil | 100.0 |

This composition is suitable for the impregnation of lumber.

*Example VI*

|  | Pounds |
|---|---|
| Methyl orthothioformate hexasulfide | 2.5 |
| Water | 50.0 |
| Commercial sticking agent | 0.5 |
| Commercial spreading agent | 0.5 |

In addition to their fungicidal properties, the methyl orthothioformate sulfide compounds of the present class are also nematocides. In a series of tests run on tomato plants, methyl orthothioformate disulfide in a concentration of 500 p. p. m. was found to provide 100% control of the nematodes with which the soil was infested.

Other modes of applying the principle of our invention may be employed instead of those explained, change being made as regards the materials or methods employed, provided the steps or compositions stated by any of the following claims or the equivalent of such stated steps or compositions be practiced or obtained.

We, therefore, particularly point out and distinctly claim as our invention:

1. A fungicidal and nematocidal composition comprising an inert pesticidal carrier material and, as the essential active ingredient, a product obtained by heating a mixture essentially comprising methyl orthothioformate and elemental sulfur, cooling the product so obtained to room temperature, and separating therefrom any free sulfur which is thereby precipitated, said heating step being carried out at such temperature and for such period of time that the product from which said precipitated sulfur has been separated contains between about 1 and about 12 atomic weights of sulfur per molecular weight of methyl orthothioformal.

2. A composition as defined by claim 1 wherein the said mixture essentially comprising methyl orthothioformate and elemental sulfur is heated at a temperature between about 100° C. and about 180° C. for from about 1 to about 4 hours.

3. A composition as defined by claim 1 wherein the said active ingredient contains between about 1 and about 6 atoms of sulfur per molecule of methyl orthothioformate.

4. A composition as defined by claim 1 wherein the said carrier comprises water and sufficient of a dispersing agent to maintain the active ingredient dispersed in said water.

5. A composition as defined by claim 4 containing between about 100 and about 1000 parts per million of the said active ingredient.

6. The method of preventing and controlling the growth of fungi on plant materials which comprises applying thereto a fungicidal amount of a product obtained by heating a mixture essentially comprising methyl orthothioformate and elemental sulfur, cooling the product so obtained to room temperature and separating therefrom any free sulfur which is thereby precipitated, said heating step being carried out at such temperature and for such period of time that the product from which said precipitated sulfur has been separated contains between about 1 and about 12 atomic weights of sulfur per molecular weight of methyl orothothioformate.

7. The method of claim 6 wherein the said methyl orthothioformate sulfide is obtained by heating methyl orthothioformate and elemental sulfur at a temperature between about 1 to about 4 hours.

8. The method of claim 6 wherein the said methyl orthothioformate contains between about 1 and about 6 atoms of sulfur per molecule of methyl orthothioformate.

9. The method of claim 6 wherein the said methyl orthothioformate is applied in the form of an aqueous dispersion.

No references cited.